United States Patent [19]

Scrivo et al.

[11] 4,086,004
[45] Apr. 25, 1978

[54] EYE GLASSES

[75] Inventors: Leonard Scrivo, Tuckahoe, N.Y.;
Sidney Goldstein, Wynmoor, Pa.

[73] Assignee: Vicon Products Corporation, Pelham Manor, N.Y.

[21] Appl. No.: 689,967

[22] Filed: May 26, 1976

[51] Int. Cl.² .......................... G02C 1/00; G02C 5/14; G02B 5/14
[52] U.S. Cl. .................................. 351/158; 351/111; 350/96.24; 362/32
[58] Field of Search .......................... 350/96 B, 96 C; 351/158, 50, 111; 240/1 LP, 2 ME

[56] References Cited
U.S. PATENT DOCUMENTS 3,410,638  11/1968  Langworthy .......................... 351/50
3,504,984  4/1970  Bush ..................................... 350/96 C Primary Examiner—Paul A. Sacher
Assistant Examiner—Rodney B. Bovernick
Attorney, Agent, or Firm—Lerner, David, Littenberg & Samuel

[57] ABSTRACT

An improved eye glass or spectacle is provided which includes means for transmitting light in the form of a fiber-optic bundle disposed in or forming an arm of the spectacle frame. In one embodiment, the spectacle frame includes a pair of lens-holding members connected by a bridge, and a pair of side-supporting arms, each of the side arms including a first end pivotally connected to the lens-holding members and a second end including an ear-engagement portion. The light-transmitting means includes a fiber-optic bundle which is disposed in or forms at least one of the side-supporting arms. The fiber-optic bundle includes an optical face adjacent the first end of the side-supporting arm for projecting light within the viewing area of the spectacle frame. The second end of the side arm includes suitable means for connecting the fiber-optic bundle to a power supply for transmitting light through the fiber-optic bundle to the optical face for projecting light within the viewing area of the spectacle frame.

19 Claims, 3 Drawing Figures

EYE GLASSES

FIELD OF THE INVENTION

The present invention relates generally to improved spectacles, and specifically to an improved spectacle which includes means for transmitting light in the form of a fiber-optic bundle integrated into the structure of the spectacle frame.

BACKGROUND OF THE INVENTION

Over the years, a number of spectacle or eye glass frames have been developed which include means for providing illumination to the viewing area of the spectacle frame. Typically, such devices include a conventional spectacle frame, a lamp mounted on the spectacle frame, and means for electrically connecting the lamp to a power supply. The purpose of such devices was to eliminate the need for the wearer of the eye glasses to carry a separate light-transmitting means, such as a flashlight, and such devices thereby freed the hands for other useful purposes.

However, it is clear that such eye glasses, having a lamp mounted thereon, have only a limited use, as they would not be worn or used when there is no intention of using the light-transmitting aspect of the device. Therefore, those who are required to wear eye glasses for proper vision would require two different pairs of glasses, one with the lamp and one without, depending on the use intended. For general purposes, conventional spectacles without light-transmitting means would be used. However, in those instances, where it is desired to see in the dark or to free the hands for other purposes, the eye glass including the illumination means, would be employed. Accordingly, it should be clear that it would be desirable to provide eye glasses with illuminating means that could be worn and used generally, as well as in those instances when the illumination feature would be desirable. In addition, it would also be desirable to provide eye glasses having illumination means which are not bulky, and which may be simply and inexpensively constructed.

Broadly, it is an object of the present invention to provide improved eye glasses which overcome one or more of the aforesaid problems. Specifically, it is within the contemplation of the present invention to provide improved eye glasses including illumination means which may be worn at all times, that is, even when the light-transmitting feature of the eye glasses is not utilized, and thereby avoids the need for two separate pairs of glasses, one with the illumination feature for specific uses and one without this feature for general use.

It is a further object of the present invention to provide improved eye glasses including illumination means disposed within the frame of the eye glasses in an unobtrusive and compact manner which may be simply and inexpensively produced.

It is a still further object of the present invention to provide improved eye glasses including illumination means, wherein the illumination means forms a portion of the eye glass frame, that is the side-supporting arm, so that the illuminating means serves the dual purpose of providing light and supporting the eye glasses on the wearer.

SUMMARY OF THE INVENTION

Briefly, in accordance with the principles of the present invention, improved eye glasses are provided which include compact light-transmitting or illumination means. More particularly, the spectacle frame includes a pair of lens-holding members connected by a bridge, and a pair of side-supporting arms. The side-supporting arms each include a first end pivotally connected to one of the lens-holding members and a second end including an ear-engagement portion. The light-transmitting means includes a fiber-optic bundle which may be either disposed in one of the side-supporting arms, or in some cases, the fiber-optic bundle will itself form the side-supporting arm of the spectacle frame. Preferably, the fiber-optic bundle extends axially between the first and second ends of the side-supporting arm and includes an optical face adjacent the first end for projecting light within the viewing area of the spectacle frame. The second end of the side-supporting arm includes means for connecting the fiber-optic bundle to a power pack for transmitting light through the fiber-optic bundle to the optical face. The connecting means preferably includes a flexible connecting element, wherein one end of the connecting element is plugged into the power pack, and the other end is plugged into a socket formed in the second end of the side-supporting arm. The power pack may be of the portable, self-contained type operated by batteries, or may be operated by plugging into an ordinary power source. Alternatively, the second end of the side-supporting arm, that is the ear-engagement portion, may itself include a miniature power pack for supplying power to the fiber-optic bundle.

Accordingly, the present invention provides a number of advantages over conventional devices. More particularly, the improved eye glasses of the present invention may be employed for general use, as well as in the specific instances when it is desired to utilize the illuminating means of the eye glasses. Therefore, it will no longer be necessary for the user to have two different sets of eye glasses, one set for general usage without the illuminating means included therein, and one set for use with the illuminating means. This is possible because the fiber-optic bundle may be integrated into the eye glass frame of the present invention so that the frame is still of conventional size and appearance. For this reason, it would be possible for the user to wear the eye glasses with the illumination means even when the illuminating feature is not being used. Moreover, as a result of the present invention, in some embodiments, the fiber-optic bundle itself can be substituted for the side-supporting arm of the eye glass frame so that the fiber-optic bundle serves the dual purpose of supporting the eye glass frame, as well as transmitting light when activated.

In addition, as the power supply means for the fiber-optic bundle may be miniaturized, the present invention also encompasses the concept of disposing a power pack directly in the side-supporting arm of the eye glass frame, preferably in the ear-engagement portion thereof, so that it would be substantially unnoticeable. Of course, each of the side-supporting arms of the eye glass frame may include a fiber-optic bundle, and both fiber-optic bundles may be removably connected to a common power pack.

BRIEF DESCRIPTION OF THE DRAWINGS

Further objects, features, and advantages of the present invention will become apparent upon the consideration of the following detailed description of a presently-preferred embodiment when taken in conjunction with the accompanying drawing, wherein.

DETAILED DISCUSSION OF PREFERRED EMBODIMENTS OF THE INVENTION

Figure 1:
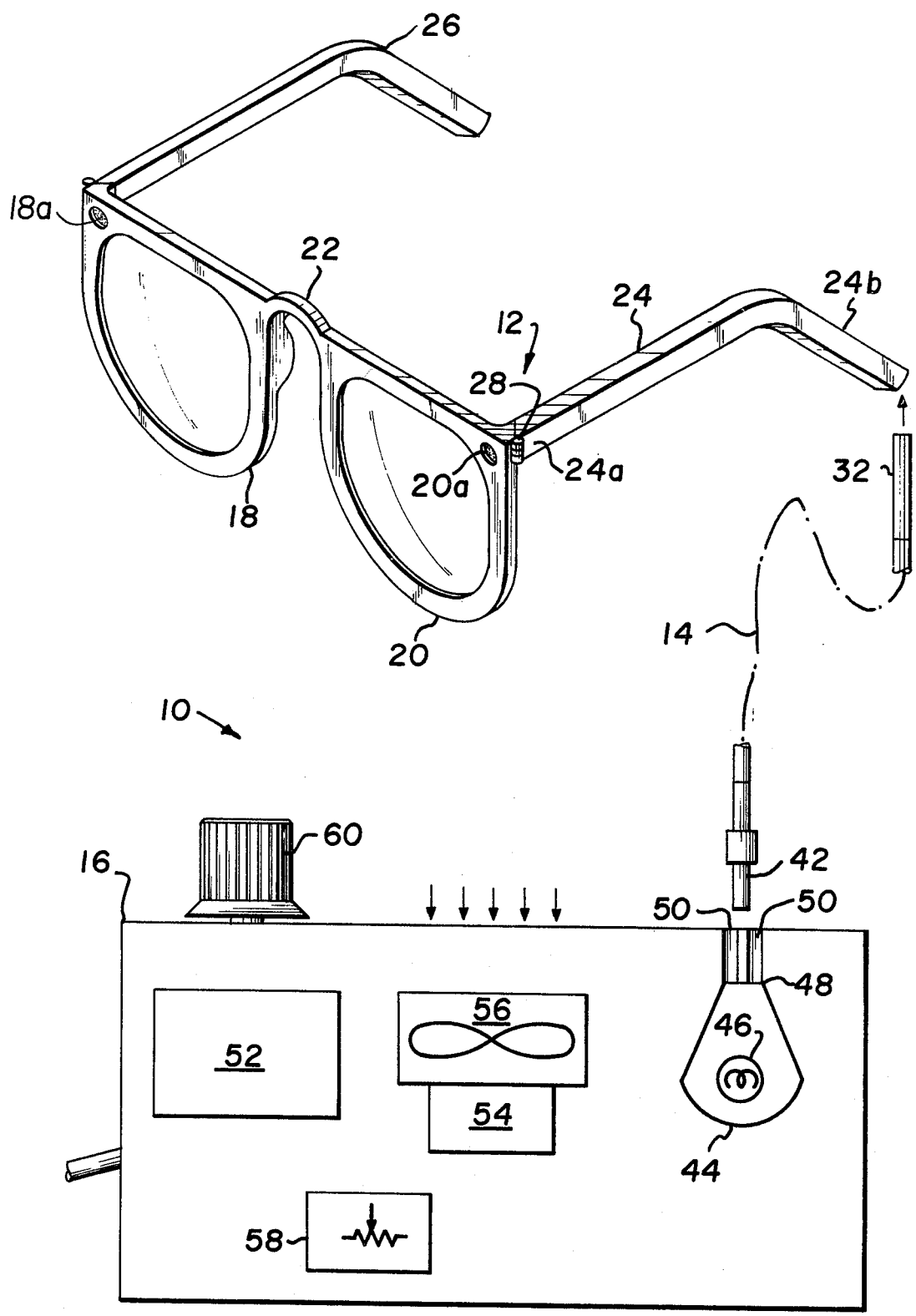
FIG. 1 is a perspective view of one form of the improved eye glasses of the present invention, and a flexible connecting element and a portable power pack.

Referring now to FIG. 1, there is shown the improved eye glasses of the present invention, generally designated by the reference numeral 10, which includes a spectacle frame 12, a flexible connecting element 14, and a power pack 16. The spectacle frame 12 includes a pair of lens-holding members 18, 20 connected by a bridge 22, and a pair of side-supporting arms 24, 26. Side-supporting arm 24 includes a first end 24a pivotally connected to lens-holding member 20 by a conventional hinge member 28. As will be explained below more fully, lens-holding member 20 is provided with an opening 20a so that when side-supporting arm 24 is pivoted to its open position, the first end thereof is adapted to be in alignment with opening 20a. Side-supporting arm 24 includes a second end 24b forming an ear-engagement portion.

Figure 2:
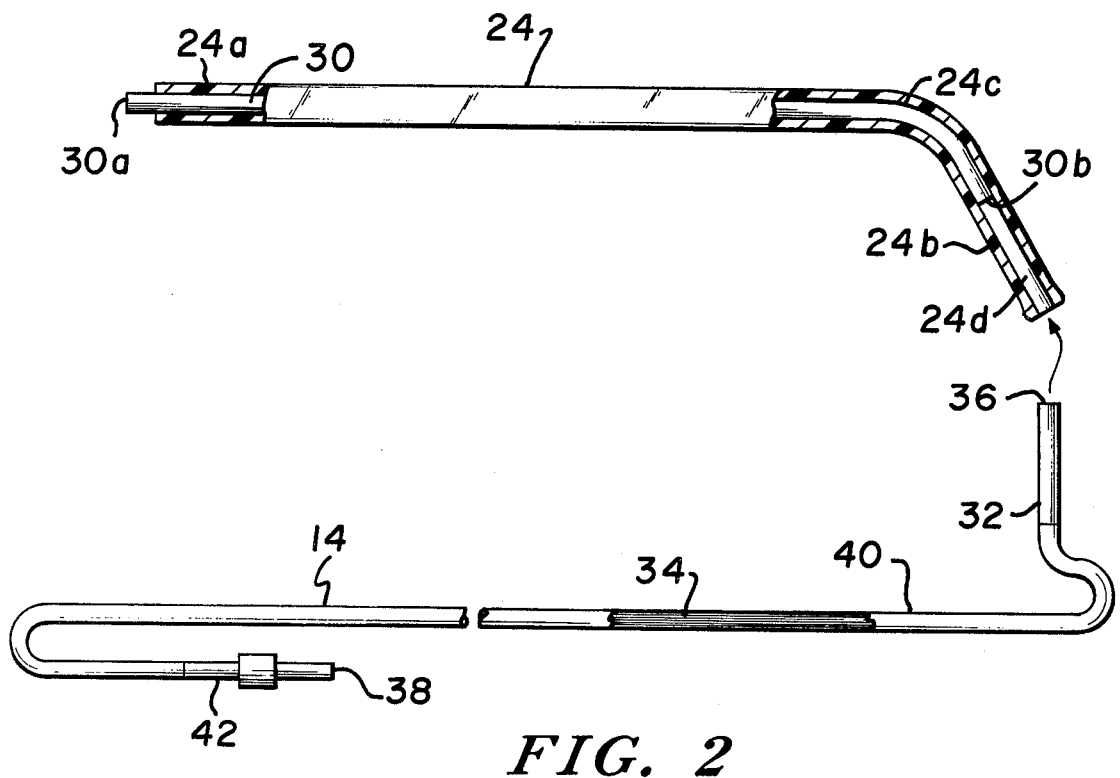
FIG. 2 is a side view, partially in section, of the side-supporting arm of the eye glass frame having the fiber-optic bundle disposed therein, and the flexible connecting element.

Turning now to FIG. 2, side-supporting arm 24 and flexible connecting element 14 are shown in greater detail. More particularly, arm 24 includes a hollow passageway 24c for receiving a fiber-optic bundle 30. The fiber-optic bundle 30 extends axially between the first end 24a and the second end 24b of the side-supporting arm 24 and includes a first optical face 30a adjacent the first end 24a and a second optical face 30b adjacent second end 24b. The fiber-optic bundle 30 may be in either of two forms. In one form, a sintered elongated glass rod is employed formed from a plurality of glass fibers sintered together to form an integral rod. In a second form, the fiber-optic bundle 30 includes a plurality of loose or individual glass fibers which are encapsulated at their ends with epoxy resin. The ends are ground and optically polished to form the optical faces 30a, 30b. However, when disposing a fiber-optic bundle having loose fibers in passageway 24c, it is necessary to provide the bundle with a covering sheath so that, if desired, side-supporting arm 24 may be molded about such a fiber-optic bundle.

It will be noted that first optical face 30a extends beyond the end 24a of side-supporting arm 24 so that when side-supporting arm 24 is pivoted into its open position, face 30a will be in alignment with and enter opening 20a for projecting light within the viewing area of spectacle frame 12. The second end 24b of side-arm 24 includes a socket for receiving one end 32 of flexible connecting element 14.

Flexible connecting element 14 includes a fiber-optic bundle 34 composed of a plurality of loose or individual glass fibers. The fiber-optic bundle 34 includes ends 36, 38 which are encapsulated with epoxy resin and are ground and optically polished to form optical faces 36, 38. In addition, the fiber-optic bundle 34 is provided with a covering sheath 40 along its length except for the ends 32, 42 which are provided with metal covering members to form end plugs 32, 42. In this manner, end plug 32 of flexible connecting element 14 is inserted into socket 24d of side-supporting arm 24 so that optical faces 30b and 36 are in alignment to transmit light from fiber-optic bundle 34 to fiber-optic bundle 30, in a manner to be explained.

Returning now to FIG. 1, there is shown one form of the power pack 16 employed in the present invention. More particularly, power pack 16 includes a reflector 44 and a high-intensity halogen lamp 46 mounted within reflector 44 to thereby focus light at location 48. Power pack 16 also includes a socket 50 for receiving end 42 of flexible connecting element 14 so that optical face 38, when inserted within socket 50, is disposed adjacent the focused light source 48. In this manner, light is transmitted from the high-intensity halogen lamp 46 disposed in power pack 16 through fiber-optic bundle 34 of flexible connecting element 14 and through fiber-optic bundle 30 of side-supporting arm 24 so that light is projected from optical face 30a within the viewing area of spectacle frame 12. Of course, power pack 16 may include a plurality of sockets 50 so that a plurality of spectacle frames 12 may be connected to a common power pack. Alternatively, if one spectacle frame 12 has a fiber-optic bundle in each arm, they can both be connected to the same power pack. In addition, power pack 16 may be plugged into a conventional power source and includes a transformer 52, and a motor 54 for driving a blower 56 for cooling the high-intensity halogen lamp 46. Also, power pack 16 includes a rheostat 58 and a control knob 60 for adjusting the rheostat 58 and thereby controlling the intensity of illumination of halogen lamp 46 to thereby vary the intensity of illumination projected from optical face 30a to the viewing area of the spectacle frame 12. Of course, power pack 16 may also be completely portable and self-contained and operated by batteries, if desired.

Figure 3:
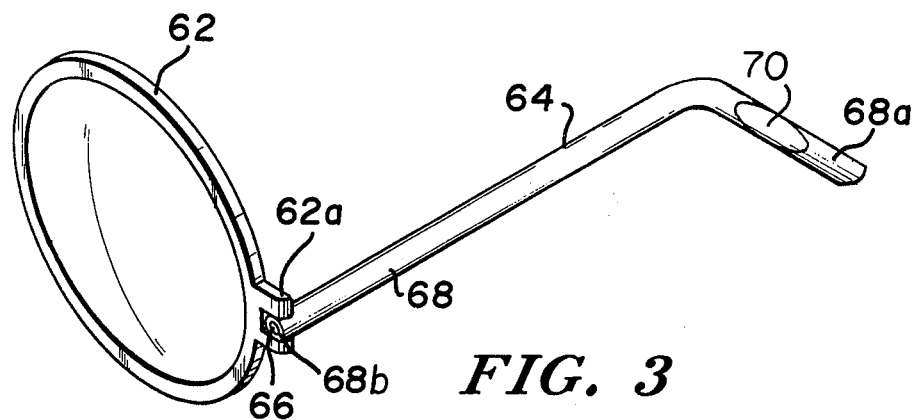
FIG. 3 is a perspective view of an alternative form of the eye glass frame wherein the fiber-optic bundle forms the side-supporting arm.

Turning now to FIG. 3, there is shown an alternate embodiment of the present invention. In this embodiment, there is only a single lens-holding member 62 and a side-supporting arm 64 pivotally connected to the lens-holding member 62. In addition, the fiber-optic bundle itself forms the side-supporting arm 64 and serves the dual purpose of transmitting light and supporting the spectacle frame on the wearer. More particularly, side-supporting arm 64 includes a fiber-optic bundle 66 disposed within a metal casing 68. The end 68a of metal casing 68 forms a socket similar to 24d for receiving a connecting element. The other end 68b of metal casing 68 includes means for pivotally connecting the supporting arm 64 to flanges 62a of lens-holding member 62. In this embodiment, it is preferable that fiber-optic bundle 66 be composed of a sintered elongated glass rod formed from a plurality of glass fibers sintered together to form an integral rod, as described above. As will be noted, in this embodiment it is not necessary to provide an opening in the lens-holding member, similar to opening 20a shown in FIG. 1, since flanges 62a extend outwardly from lens-holding member 62 in a manner employed on conventional spectacle frames. Of course, side-supporting arm 64 could also be substituted for arm 24 in the first embodiment.

With respect to the supply of power, it should also be noted that the present invention contemplates the use of a miniaturized power pack 70 including a high-intensity lamp and miniaturized batteries which may be disposed within or adjacent to ear-engagement portion 68a. [Although not specifically illustrated in the drawing.] The miniaturized power pack would include a housing for the battery and lamp disposed in the ear-engagement portion 68a so that the lamp transmits light to optical face at 66b.

As pointed out above, the present invention contemplates the use of a fiber-optic bundle in the side-supporting arm of a spectacle frame which includes only a single lens-holding member, and also the present invention does not require that the side-supporting arm be pivoted relative to the lens-holding member or members but may be connected thereto in any suitable manner. That is, it is within the contemplation of the present invention that the side-supporting arm may be rigidly affixed to the lens-holding member or members.

A latitude of modification, change, and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. An improved viewing device comprising, in combination:
   a spectacle frame including a pair of lens-holding members connected by a bridge member, and a pair of side-supporting arms, said side-supporting arms each including a first end connected to one of said lens-holding members and a second end including an ear-engagement portion;
   means for transmitting light including a fiber-optic bundle disposed in at least one of said side-supporting arms, said fiber-optic bundle extending axially between said first and second ends and including a first optical face adjacent said first end of said side-supporting arm for projecting light within the viewing area between said spectacle frame and the object to be viewed, and a second optical face adjacent said second end of said side-supporting arm; and
   means for connecting the second optical face of said fiber-optic bundle to a power supply for transmitting light through said fiber-optic bundle to said first optical face.

2. The combination of claim 1 wherein said side-supporting arms are pivotally connected to said lens-holding members and pivot between an operative and inoperative position, and at least one of said lens-holding members includes an opening formed therein in alignment with said first optical face when said one supporting arm is moved to said operative position and through which light is projected into the viewing area of said spectacle frame.

3. The combination of claim 1 wherein said fiber-optic bundle includes a sintered elongated glass rod formed from a plurality of glass fibers sintered together to form an integral rod including said first and second optical faces.

4. The combination of claim 1 wherein said fiber-optic bundle includes a plurality of separate glass fibers, the ends of said bundle being encapsulated to form said first and second optical faces.

5. The combination of claim 1 wherein said light-transmitting means includes a fiber-optic bundle disposed in each of said side-supporting arms.

6. The combination of claim 1 further including a power pack releasably connected to said fiber-optic bundle by said connecting means.

7. The combination of claim 6 wherein said connecting means includes a flexible light-transmitting connecting element disposed between said fiber-optic bundle and said power pack.

8. The combination of claim 7 wherein said connecting means further includes a socket formed in said ear-engagement portion and a socket formed in said power pack, each of said sockets adapted to receive one end of said connecting element.

9. The combination of claim 7 wherein said connecting element includes a second fiber-optic bundle including first and second optical faces for connection to the fiber-optic bundle disposed in said one side-supporting arm and for connection to said power pack.

10. The combination of claim 7 wherein said flexible connecting element includes a second fiber-optic bundle formed from a plurality of separate glass fibers having their ends encapsulated to form first and second optical faces.

11. The combination of claim 6 wherein said power pack includes a reflector, a high-intensity lamp mounted in said reflector, and a socket for receiving said connecting means.

12. The combination of claim 11 wherein said power pack includes a plurality of sockets for receiving a plurality of said connecting means.

13. The combination of claim 6 wherein said power pack is portable and self-contained.

14. The combination of claim 1 wherein one of said ear-engagement portions includes a miniature power pack for supplying power to said fiber-optic bundle.

15. The combination of claim 5 wherein said fiber-optic bundles disposed in said side-supporting arms are each removably connected to a common power pack.

16. The combination of claim 1 further including means for controlling the power supplied to said fiber-optic bundle to thereby vary the intensity of illumination.

17. An improved viewing device comprising, in combination:
   a spectacle frame including a lens-holding member and a side-supporting arm, said side-supporting arm including a first end connected to said lens-holding member and a second end including an ear-engagement portion;
   means for transmitting light including a fiber-optic bundle forming at least a portion of said side-supporting arm, said fiber-optic bundle extending axially between said first and second ends and including an optical face adjacent said first end of said side-supporting arm for projecting light within the viewing area between said spectacle frame and the object to be viewed, and said second end of said side-supporting arm including means for connecting said fiber-optic bundle to a power supply for transmitting light through said fiber-optic bundle to said optical face.

18. An improved viewing device comprising, in combination:
   a spectacle frame including a pair of lens-holding members connected by a bridge member, and a pair of side-supporting arms, said side-supporting arms each including a first end connected to one of said lens-holding members and a second end including an ear-engagement portion, said side-supporting arms being pivotally connected to said lens-holding members to pivot between an operative and inoperative position;

means for transmitting light including a fiber-optic bundle disposed in at least one of said side-supporting arms, said fiber-optic bundle extending axially between said first and second ends and including a first optical face adjacent said first end of said side-supporting arm for projecting light within the viewing area between said spectacle frame and the object to be viewed, and a second optical face adjacent said second end of said side-supporting arm;

at least one of said lens-holding members including an opening formed therein in alignment with said first optical face when said one supporting arm is moved to said operative position; and means for connecting the second optical face of said fiber-optic bundle to a power supply for transmitting light through said fiber-optic bundle to said fiber-optical face and through said opening to said viewing area of said spectacle frame.

19. An improved viewing device comprising, in combination:

a spectacle frame including a pair of lens-holding members connected by a bridge member, and a pair of side-supporting arms, said side-supporting arms each including a first end connected to one of said lens-holding members and a second end including an ear-engagement portion;

means for transmitting light including a fiber-optic bundle disposed in at least one of said side-supporting arms, said fiber-optic bundle extending axially between said first and second ends and including a first optical face adjacent said first end of said side-supporting arm for projecting light within the viewing area between said spectacle frame and the object to be viewed, and a second optical face adjacent said second end of said supporting arm;

a power pack; and means for connecting the second optical face of said fiber-optic bundle to said power pack for transmitting light through said fiber-optic bundle to said first optical face and to said viewing area.

* * * * *

UNITED STATES PATENT OFFICE
CERTIFICATE OF CORRECTION

Patent No. 4,086,004            Dated April 25, 1978

Inventor(s) Leonard Scrivo et al.

It is certified that error appears in the above-identified patent and that said Letters Patent are hereby corrected as shown below:

On the Title page, Item [73] Should read:

--- Vicon Products Corporation, Pelham Manor, New York, part interest ---.

Signed and Sealed this

Twelfth Day of September 1978

[SEAL]

Attest:

RUTH C. MASON
*Attesting Officer*

DONALD W. BANNER
*Commissioner of Patents and Trademarks*